March 29, 1960  R. C. WHITEHEAD, JR  2,930,390
TRANSMITTING APPARATUS
Filed Sept. 24, 1956  2 Sheets-Sheet 1
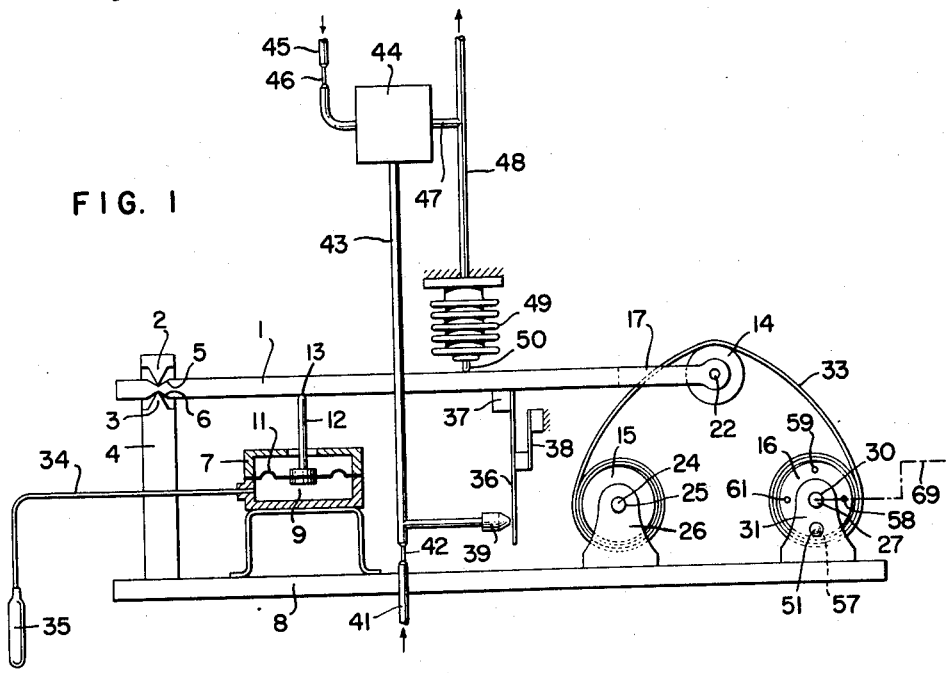
INVENTOR.
ROBERT C. WHITEHEAD JR.
BY Arthur H. Swanson
ATTORNEY.

March 29, 1960     R. C. WHITEHEAD, JR     2,930,390
TRANSMITTING APPARATUS
Filed Sept. 24, 1956        2 Sheets-Sheet 2
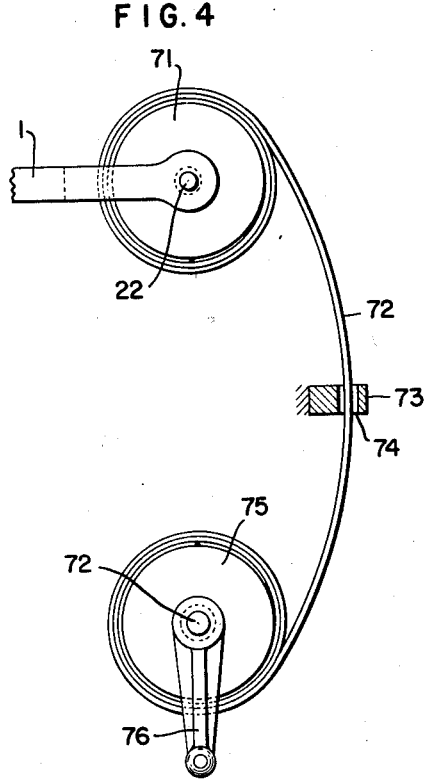
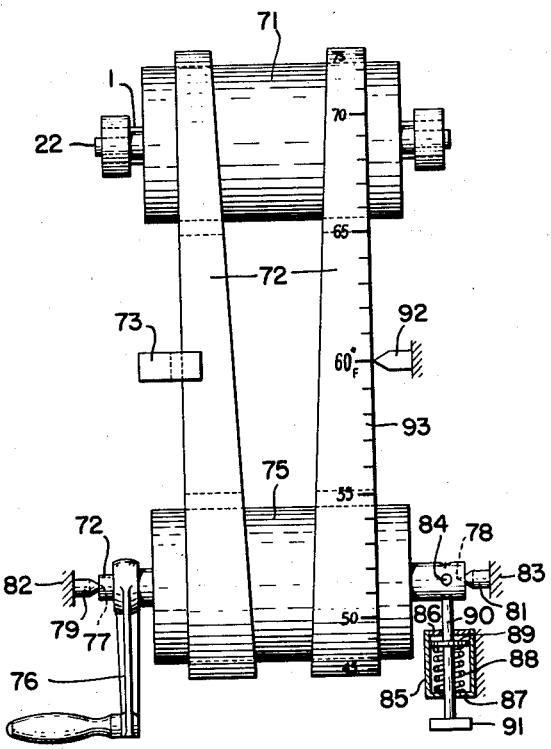
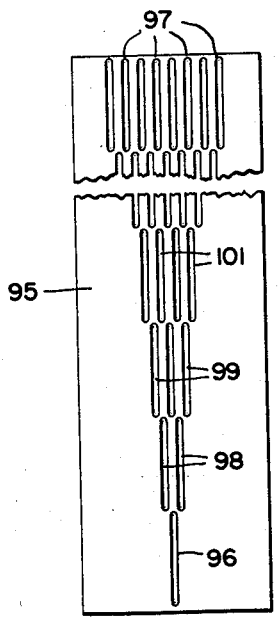
INVENTOR.
ROBERT C. WHITEHEAD JR.
BY Arthur H. Swanson
ATTORNEY.

United States Patent Office 2,930,390
Patented Mar. 29, 1960

2,930,390

TRANSMITTING APPARATUS

Robert C. Whitehead, Jr., Oreland, Pa., assignor to Minneapolis-Honeywell Regulator Company, Minneapolis, Minn., a corporation of Delaware Application September 24, 1956, Serial No. 611,684

13 Claims. (Cl. 137—85)

The general object of the present invention is to provide a novel and improved means for varying the zero point, or in other words the zero suppression effect of a pneumatic temperature or pressure transmitter, for example as shown in the Stokes et al. patent application, Serial No. 347,812, filed April 9, 1953, now the U.S. Patent No. 2,823,688.

Another object of the present invention is to provide a novel and effective means for separately subjecting a compressible chamber element containing an elastic fluid under variable pressure to a manually adjustable opposing spring force of a predetermined magnitude.

A more specific object of the present invention is to provide an adjustable coiled prestressed flat spring that can supply a suppression force to a force actuated beam, which spring possesses a negligible gradient.

Another object of the present invention is to provide a spring for a suppression system, which, although its gradient is negligible as it applies large compression forces to a force actuated beam, it requires only a small area in which to operate.

A still more specific object of the present invention is to provide a slot or a plurality of slots in the aforementioned coiled prestressed flat spring so as to enable the spring to apply a varying amount of suppression force to a force actuated beam as the spring is unwound from a supply spool and wrapped onto a take-up spool.

In a preferred form of the invention, I make use of a beam having one end portion arranged to turn about a pivot and provide novel means, which is longitudinally displaced from said pivot, to give a spring force of a predetermined magnitude. This force opposes the variable force impressed on the beam by a chamber element and may be referred to hereinafter as the chamber opposing force or suppression force. In the preferred form of the invention illustrated, this suppression or chamber opposing force is obtained by looping a suitably preflexed spring steel strip having a tapered slot therein about the second end portion of the beam, and by nonrotatably locking in place at least one end portion of the strip to a stationary means so that the spring will tend to oppose the movement transmitted to said beam by the chamber member. The steel strip may be preflexed in a known manner to cause the strip to coil about an axis. In practice, at least one end of the strip is attached to a rotatable spool or element journaled to rotate about an axis transverse to and longitudinally displaced from said second end portion of the beam.

In the preferred form of the invention that is illustrated in Fig. 1 of the drawing, the steel strip is so preflexed that each end portion of the strip it attached to and tends to coil snugly about a corresponding anchoring cylinder. One of the cylinders is locked in a preset selected position and the other of the cylinders is free to rotate about an axis at a suitable distance from the adjacent portion of said beam. The steel strip is of sufficient length that a portion of each end of the strip may be coiled about the axis of the corresponding spool and thereby subject the uncoiled portion of the strip to a longitudinal stress.

A better understanding of the present invention may be had from the following detailed description which reads in connection with the accompanying drawing in which:

Fig. 1 is a diagrammatic elevation of a desirable embodiment of the invention;

Fig. 2 is an end elevation of the apparatus shown in Fig. 1;

Fig. 3 indicates the position to which the suppression spring locking apparatus shown in Fig. 2 may be rotated to place it in an unlocked position;

Fig. 4 shows a modified suppression spring which may be substituted for the suppression spring shown in Fig. 1;

Fig. 5 is an end elevation of the suppression spring shown in Fig. 4; and

Fig. 6 shows a modified form of suppression spring which may be substituted for the suppression spring shown in Figs. 2 or 5.

The apparatus illustrated in Fig. 1 of the drawing comprises a horizontally disposed beam 1 which corresponds to the primary beam shown in the aforementioned Stokes et al. patent application, Serial No. 347,812, filed April 9, 1953, now U.S. Patent No. 2,823,688. The beam 1 has one end connected by knife edge pivots 2 and 3 to the upper end of the stationary pier 4. As shown, the left end of the beam 1 extends between these opposed lower and upper knife edge pivots 2 and 3 respectively. These pivots 2 and 3 are shown as having their knife edges parallel to and facing one another and extending into suitably formed bearing notches such as notch 5 in the upper side of the beam and notch 6 in the lower side of the beam. The beam is normally subjected to an upward thrust by an expansible capsule or pressure chamber element 7 supported on a base 8. The element 7 has a rigid bottom wall beneath, and a flexible top wall 11 above a pressure chamber 9. This chamber normally contains a compressible fluid under pressure. The flexible top wall 11 supports an uprising thrust element 12 which engages the beam 1 at 13. An increase in the pressure of the compressible fluid in chamber 9 causes the right end of the beam 1 to turn counterclockwise about the pivot points 2 and 3.

As shown in Fig. 1 the portion of the beam 1 that is engaged at 13 by the thrust member 12 is intermediate the stationary pier 4 and a roller or spool 14 which is supported by the end of the beam remote from the pivots 2 and 3. The axis of the roller 14 is transverse to the respective lengths of the beam 1 and parallel to a plane passing through the center of the axis of the spools 15 and 16. The end of the beam 1 adjacent the roller 14 has forked end portions 17, 18. Fig. 2 shows the forked end portion 17 with an aperture 19 therein and forked end portion 18 with an aperture 21 which is aligned with 19. Fig. 2 also shows journalled in these apertures the shaft extensions 22, 23 of the roller 14. The spool 15 is shown in the Fig. 1 of the drawing with a shaft extension 24 supported in a journal 25 that in turn is supported in the support elements 26, and this support element 26 is in turn fixedly attached to the supporting base member 8. Another shaft extension aperture and supporting element is used to support the other end of a spool 15 in this same manner as the elements 25 and 26 support 24 in Fig. 1. In a similar manner, there is also shown in Fig. 2 the shaft extensions 27, 28 of the spool 16 which are journalled in apertures 29, 30 of the supporting elements 31, 32 which are in turn mounted on the supporting base 8.

The roller 14 is operably connected to the spools 15 and 16 by a spring steel strip 33. This strip 33 has a uniformly tapered slot along its longitudinal axis that runs from one end portion of the spring to the other end portion. This spring is looped over the roller 14, and each end of the strip 33 has a preflexed tendency to coil about an axis so that each end portion is free to coil about its associated spool 15 or 16 as shown in Fig. 1. The portion of the strip 33 connected to the spool 15 is uncoiled about the latter in a clockwise direction and a portion of the strip 33 connected to the spool 16 is uncoiled from the latter in a counter-clockwise direction. The end of the beam 1, remote from the pivots 2 and 3, is turned up and down, respectively, as a result of increases and decreases in the fluid pressure of the chamber element 7.

As shown in Fig. 1 of the drawing, a fluid under pressure is passed into the fluid chamber 9 of the chamber element 7 through a conduit 34 from a bulb 35 that contains a compressible fluid pressure which may be a suitable fluid. As the fluid pressure transmitted to the chamber 9 from the bulb 35 increases, this pressure increase will cause the diaphragm 11, thrust element 12, and beam 1 to move in an upward counter-clockwise direction about the pivot 2. As this beam motion takes place, the flapper 36 will be caused to move about its flexible leaf spring pivot means 37, 38 toward the face of the nozzle 39. When this flapper action occurs, the pressure of the fluid air supply in the nozzle 39 that has been fed into the nozzle chamber by way of the air supply conduit 41 and restriction 39 will be increased, this increase in pressure is transmitted through the transmission line 43 to a pilot valve 44 which has an air pressure supply inlet passage 45 having a restriction 46. This pilot valve in turn transmits a pressure that is proportional to but at a higher level than a pressure that it receives from the input pressure 43. This output pressure from the pilot valve is transmitted through the conduit 47, 48 to a feedback bellows 49 that contains a beam connection 50. As can thus be seen, as the pressure in the chamber 9 of the chamber element 7 is increased and the flapper 36 is moved towards the nozzle 39, the feedback pressure transmitted by way of the bellows 49 to its beam connection 50 will likewise be increased.

On the other hand, if the pressure in the chamber 9 of chamber element 7 is decreased, it can readily be seen that the flapper 36 will be moved away from the nozzle 39 and the force exerted by the feedback bellows through the beam connection 50 on the beam 1 will be reduced.

The suppression force slotted spring strip 33 may be provided with a means for retaining the spool 16 in a nonrotatable position. This lock is comprised of a rotatable head portion 51, a shaft 52 that protrudes through an aperture 53 in the support member 31. The right end portion of this shaft 52 contains a portion 56 which may be engaged in any one of a number of bored out portions, such as the bored out portions 57, 58, 59, 61. This locking shaft also contains a shoulder portion 62 between the end portion 56 and head portion 51. Between this shoulder portion and the support 31 there is shown a coil spring which is normally permitted to apply a force through the shoulder portion 62 to retain the right end of the shaft in one of the apertures, for example 57, as is illustrated in Fig. 2 of the drawing.

Fig. 3 of the drawing shows the lock in a disengaged position. It can readily be seen that the pins 63, 64 have been rotated out of the deep apertures, 65, 66, as shown in Fig. 2 of the drawing, into the shallow apertures 67, 68 as shown in Fig. 3 of the drawing.

In normal operation, a suitable rotatable means such as the rotatable crank arm means 69 that is connected to the shaft extension 27 is used to wrap or unwrap the desired amount of the slotted spring strip 33 on the spool 16 so that the desired suppression force as indicated by the pointer 50 may be applied to the beam 1. When the desired amount of suppression force is applied to the beam 1 in this manner, the head portion 51 is rotated from its unlocked position as shown in Fig. 3 of the drawing to a locked position as shown in Fig. 2 of the drawing.

During this normal suppression force adjusting operation a suppression force of a predetermined magnitude can be applied to the roller 14 on the right end of the beam 1. This force will vary in magnitude from a large amount to a small amount depending on whether the active portion of the spring strip passing over the roller 14 contains the portion of the spring nearest the end having the narrowest portion of the tapered slot or the widest portion of this slot. In either case, the gradient of the spring will be of a negligible value. In other words when this preflexed or zero spring 33 is placed in one of the aforementioned preselected positions and a deflection of this spring is altered, by a change in the magnitude of force which the thrust member 12 is applying to roller 14 through beam 1, 17, this deflection will have a negligible effect on the magnitude of force which the spring was imposing on the beam prior to the time that the aforementioned deflection of this spring took place.

The preflexed characteristic of the spring is also such that as this suppression or zero spring 33 is placed in the other of the aforementioned positions and a deflection of the spring is affected by this member 12 in the manner noted supra this change in spring deflection will also have a negligible effect on the magnitude of force which the spring was applying to the beam prior to the time that the aforementioned deflection took place.

Experimentation has shown that it is necessary to change the magnitude of a suppression force that is acting on a transmitter of the type previously mentioned in this application when it is desired to alter the zero end of the span over which different ranges in temperature measurement may be sensed by the transmitter. As the preflexed spring 33 can be placed in any one of the number of positions to vary the magnitude of suppression force that the spring can apply to the beam, this spring 33 meets this first requirement.

Experimentation has further shown that in order to have a satisfactory suppression means for such a transmitter it is further necessary that it be readily adjustable so that relatively small to very large changes in a suppression force is obtainable with such a means. As the length of spring 33 can be several feet and the tapered slot extended from one of its ends to another it is possible to move a large unit portion of the spring from one spool to another in order to obtain a small unit change in the suppression force that is applied to the beam. With suppression force apparatus that have been used prior to the spring type suppression means presented in this application it has been difficult to make such an adjustment since these prior suppression force apparatus required a much smaller adjustment over which small changes in the magnitude of the suppression force could be made than that afforded by the preflexed spring 33 as noted supra.

Finally experimentation has shown an ideal suppression system for a transmitter of the aforementioned type must include a force suppression means which has to be not only adjustable to apply different suppression forces to the transmitter but must also apply each of these different forces to the transmitter without itself introducing any undesirable gradient into the transmitter. As previously noted the preflexed type of spring 33 that is disclosed in this application meets this need very satisfactorily.

A modified form of this suppression spring is illustrated by way of an example in Fig. 4 of the drawing. The embodiment of the invention disclosed in this figure shows a spool 71 attached to the shaft 22, 23 at the end of the beam 1 in the same manner that the roller 14 is attached to the shaft 22, 23 shown in Figs. 1 and 2. The spring strip 72 shown in Fig. 4 has a uniformly tapered slot in a portion of the strip that runs along its longitudinal axis in the same manner as that previously described for the spring strip 33 shown in Figs. 1 and 2. One of the chief differences between the suppression spring apparatus shown in Fig. 4 and that shown in Fig. 1 is that in the Fig. 1 spring apparatus the roller 14 is used to transfer the up and down beam forces to a selected portion of the spring whose respective ends are mounted on two spools, whereas in Fig. 4 the spool 71 on the end of the beam 1 is being made use of as a means on which one end of the spring strip 72 may be coiled. If it is so desired, a guide member 73 having a slotted portion 74 therein to guide the edge of the spring strip 72 as portions of the spring are transferred between the spool 71 and the spooling means as is shown in Fig. 4 of the drawing may be used. This spool 75 and its associated crank arm 76 may be identical to the spool 16 and the crank arm 69 already disclosed under the description of Fig. 1. However, the end portion 77, 78 of the spool 75, in lieu of being mounted in journals, as is disclosed in Fig. 1, may, as indicated in Fig. 4, be mounted by means of suitable pivot pins 79, 81 to their associated stationary support members 82, 83.

In Fig. 5 of the drawing, the right end portion 78 of the spool 75 is shown integral with the spool and having a plurality of holes such as, e.g., the hole 84 punched into its outer surface. Adjacent this right end portion 78, there is shown a locking apparatus which is comprised of a hollow cylindrical member 85 containing two apertured end plates 86, 87. This lock may be of any well known variety, such as the variety shown, which has a coil spring 88 that acts on a shoulder 89 to manually retain the pin 90 in engagement with one of the punched out holes 84 in the integral right end portion 78 of the spool 75. When a release of the pin 90 from the punched out hole 84 is desired, in order to rotate the suppression spring 72 to a new position on the spool 75, the operator need only pull outwardly on the handle 91 that is shown integrally connected at its lower end to the shoulder 89. Fig. 5 also shows a pointer 92 that is fixedly attached to the stationary member. This pointer 92 is shown pointing to the sixty degree F. mark on the indicating scale 93 that is inscribed on the outer longitudinal edge of the suppression spring 72. With this pointer 92 arrangement and the lock 91 in a disengaged position, the crank arm 76 may be rotated so that any desired suppression reading on the spring scale 93 may be brought into alignment with the suppression scale indicating pointer 92. It can thus be seen that this pointer 92 and the suppression spring 72 shown in Fig. 5 of the drawing are positioned relative to each other in a manner similar to the pointer 50 and the suppression spring 33 shown in Fig. 2 of the drawing. After the aforementioned desired crank arm rotation has been completed and the aforementioned desired suppression reading is brought into alignment with the pointer, the portion 91 of the lock shown in Fig. 5 may then be released inwardly to enable the coil spring 88 to move the pin 91 into engagement with the punched out hole 84 or any one of the other holes in the cylindrical surface of the end portion 73. This latter action will prevent the spool 75 from being rotated by the force applied to the end of the spring 72 attached to the spool 71 when the magnitude of the force acting on the beam 1 is changed.

Fig. 6 of the drawing shows a modified form of spring strip 95 which may be substituted for either the slotted spring strip 33 shown in Figs. 1 and 2 or the slotted spring strip 72 that is shown in Figs. 4 and 5. The Fig. 6 showing of the spring strip 95 is similar to the spring strips 33 and 72 in some respects because the longitudinal cross sectional area of the strip 95 is uniformly and progressively decreased from one end portion of the strip to the other in both springs. However, instead of obtaining this uniformly decreasing cross sectional area by means of a tapered slot as in Figs. 2 and 5, the spring as shown in Fig. 6 achieves the same type of reduction in strip cross sectional area between the ends of the strip by making use of a plurality of uniformly elongated slots. At the lower end portion of the strip 95 there is shown in Fig. 6 one such slot 96 whose longitudinal axis coincides with the longitudinal axis of the strip 95. At the upper or other end portion of the strip 95 there is shown a plurality of rows of slots 97 which are each identical dimension wise to the single slot 96. Between the single slot row 96 and the multiple slot row 97 there is shown a plurality of rows 98, 99, 101, each row of which has a progressively decreasing number of slots. Each of the slots in these rows are of the same dimension as the slot 96. The ends of each slot in each of the respective rows are shown overlapping its preceding and succeeding row so that a gradual uniform longitudinal cross sectional area decrease will be achieved between one end of the strip and the other.

From the aforementioned remarks, it can thus be seen that either the slotted springs 33, 72 or the spring 95, referred to in this application, is of a substantial benefit when used for a suppression system of a transmitting instrument, because while each spring possesses a negligible gradient it may be adjusted to produce a large change in the force it effects in order that the zero point of the transmitter may be adjusted. These slotted springs also have the added advantage, because of their negligible gradient, of being able to tolerate large deflecting forces of such an instrument without permitting any substantial change in its suppression force effect. Finally, these slotted springs not only reduce to a minimum the area required for such a suppression system, but they also provide a means whereby small incremental changes in spring force may be spread over much longer portions of a suppression indicating scale and thus provide a scale that is more easily decernable than suppression scales that have heretofore been used.

What is claimed is:

1. A beam pivoted to oscillate about one of its end portions, a first means engaging the lower surface of a portion of said beam at a position that is adjacent said beam pivot, a second means engaging the upper surface of a portion of said beam at a position that is located between said first means and said free end of said beam, said first and second means being transverse to the longitudinal axis of said beam, said first and second means each being operably connected for movement to a separate fluid actuating flexible chamber, an inlet for said chamber that is connected to said first means, through which an input fluid pressure of varying magnitude is transmitted, a flapper element connected by means of a flexible pivot to said beam at a position that is located between said second means and said free end of said beam, a vehicle for transmitting pressure fluid through a restriction to said second chamber and to and through a nozzle that is located adjacent the face of said flapper element, an adjustable prestressed flat spring possessing substantially a zero gradient operably connected to the free end of said beam for applying a zero suppression force to the beam and said spring having a uniformly tapered slotted-out portion between its end portions whose longitudinal axis coinsides with a line passing through the longitudinal axis of the spring.

2. Means for adjusting the zero suppression effect on a force balanced horizontally positioned cantilever beam comprising, a roller mounted on the free end of said beam, a first and second spooling means located in a juxtapositioned relationship to said roller and each being rotatably mounted on a stationary support member, an elongated prestressed flat spring having a uniformly tapered slot between its elongated end portions, said one of said spring ends being fixedly attached to said first spooling means and its other end fixedly attached to said second spooling means, said spring having a portion between its ends in contact with the upper surface of said roller and said spring acting to uniformly vary the magnitude of force transmitted to said roller as said spring is transferred from one spool to the other.

3. The means for effecting a zero adjusting suppression effect as specified in claim 2 wherein a locking means is provided between one of said spools and its associated stationary support member to maintain a predetermined constant spring force on said roller.

4. The means for effecting a zero adjusting suppression effect as specified in claim 2 and wherein a locking means is provided to lock one of said spools to its associated stationary support member whenever a selected length of spring has been transferred from one spool to the other.

5. Means for adjusting the zero suppression effect on a force balanced horizontally positioned cantilever beam comprising, a roller mounted on the free end of said beam, a first and second spooling means located in a juxtaposition relationship to said roller and each being rotatably mounted on a stationary support member, an elongated prestressed flat spring, said portion between the end portions of said spring being of a gradual and uniformly decreasing cross sectional area, said one of said spring ends being fixedly attached to said first spooling means and its other end fixedly attached to said second spooling means, said spring having a portion between its ends in contact with the upper surface of said roller and said spring acting to apply a variable force to said roller as said spring is transferred from one spool to the other.

6. The means for adjusting the zero suppression effect as specified in claim 5 and wherein said longitudinal portion extending between the ends of this strip has provided therein rows of gradually increasing number of spaced apart elongated slots, and wherein the ends of the slots in each row extend between the ends of each succeeding row of slots and provide said gradual and uniformly decreasing cross section between the ends of the springs.

7. Means for adjusting the zero suppression effect on a force balanced horizontally positioned cantilever beam comprising, a spool rotatably mounted on the free end of said beam, a spooling means mounted in a juxtaposition relationship to said spool and being rotatably mounted on a stationary support member, an elongated prestressed flat spring having a uniformly tapered slot between its end portions, said one of said spring ends being fixedly attached to said spooling means and its other end fixedly attached to said spool mounted on said beam, and said spring acting to uniformly vary the magnitude of force transmitted to said spool and said beam as said spring is transferred from said spool to said spooling means or vice-versa.

8. The means for effecting a zero adjusting suppression effect as specified in claim 7 wherein a locking means is provided between said spooling means and its associated stationary support member to maintain a selected constant spring force on said beam mounted spool.

9. The means for effecting a zero adjusting suppression effect as specified in claim 7 wherein a locking means is provided to lock said spooling means to its associated stationary support member whenever a selected length of spring has been transferred from said spool on said beam to said spooling means or vice-versa.

10. Means for adjusting the zero suppression effect on a force balanced horizontally positioned cantilever beam comprising, a spool rotatably mounted on the free end of said beam, a spooling means mounted in a juxtaposition relationship to said spool and being rotatably mounted on a stationary support member, an elongated prestressed flat spring, said portion between the end of said spring being of a gradual and uniformly decreasing cross sectional area, said one of said spring ends being fixedly attached to said spooling means and its other end fixedly attached to said spool mounted on said beam, and said spring acting to apply a force of varying magnitude to said spool and said beam as said spring is transferred from said spool to said spooling means or vice-versa.

11. The means for adjusting the zero suppression effect as specified in claim 10 and wherein said longitudinal portion extending between the ends of the said strip has rows of gradually increasing numbers of spaced apart elongated slots provided therein, said ends of the slots in each row extending between the ends of each succeeding row of slots and providing said portion between ends of the spring with said gradual and uniformly decreasing cross sectional area.

12. A prestressed flat spring means comprising, a first elongated end portion wound about and connected at its inner end to the outer surface of a spooling means, a second elongated end portion wound about and connected at its inner end to the outer surface of a rotatable spool, a third portion integrally connecting said outer end portions of said first and second elongated end portions, said central longitudinal portion of said first, second and third elongated portions of said spring having a uniformly tapered slot passing therethrough whose narrowest portion is adjacent one of the inner ends of one of the said elongated end portions and its widest portion is adjacent one of the inner ends of the other of said elongated end portions.

13. A pivoted beam member and means for applying a rotational biasing force to a roller mounted on said beam member, comprising a movable elongated prestressed flat coil spring means, a spooling means for transferring portions of said spring between two spools that have the respective ends of the spring attached thereto and said spring having a cross sectional area of gradual decreasing dimension between one end portion of the spring and the other for affording a gradual change in the spring force in a portion of the spring running between the said two spools that is in contact with said roller mounted on said beam member as said spring is transferred from one of said spools to the other.

References Cited in the file of this patent

UNITED STATES PATENTS

| Number | Name | Date |
|---|---|---|
| 1,628,668 | Howell | May 17, 1927 |
| 2,053,797 | King | Sept. 8, 1936 |
| 2,336,887 | Piron | Dec. 14, 1943 |
| 2,405,979 | Rosenberger | Aug. 20, 1946 |
| 2,563,374 | Rosenberger | Aug. 7, 1951 |
| 2,609,193 | Foster | Sept. 2, 1952 |
| 2,732,849 | Rosenberger | Jan. 13, 1956 |